United States Patent Office 3,323,876
Patented June 6, 1967

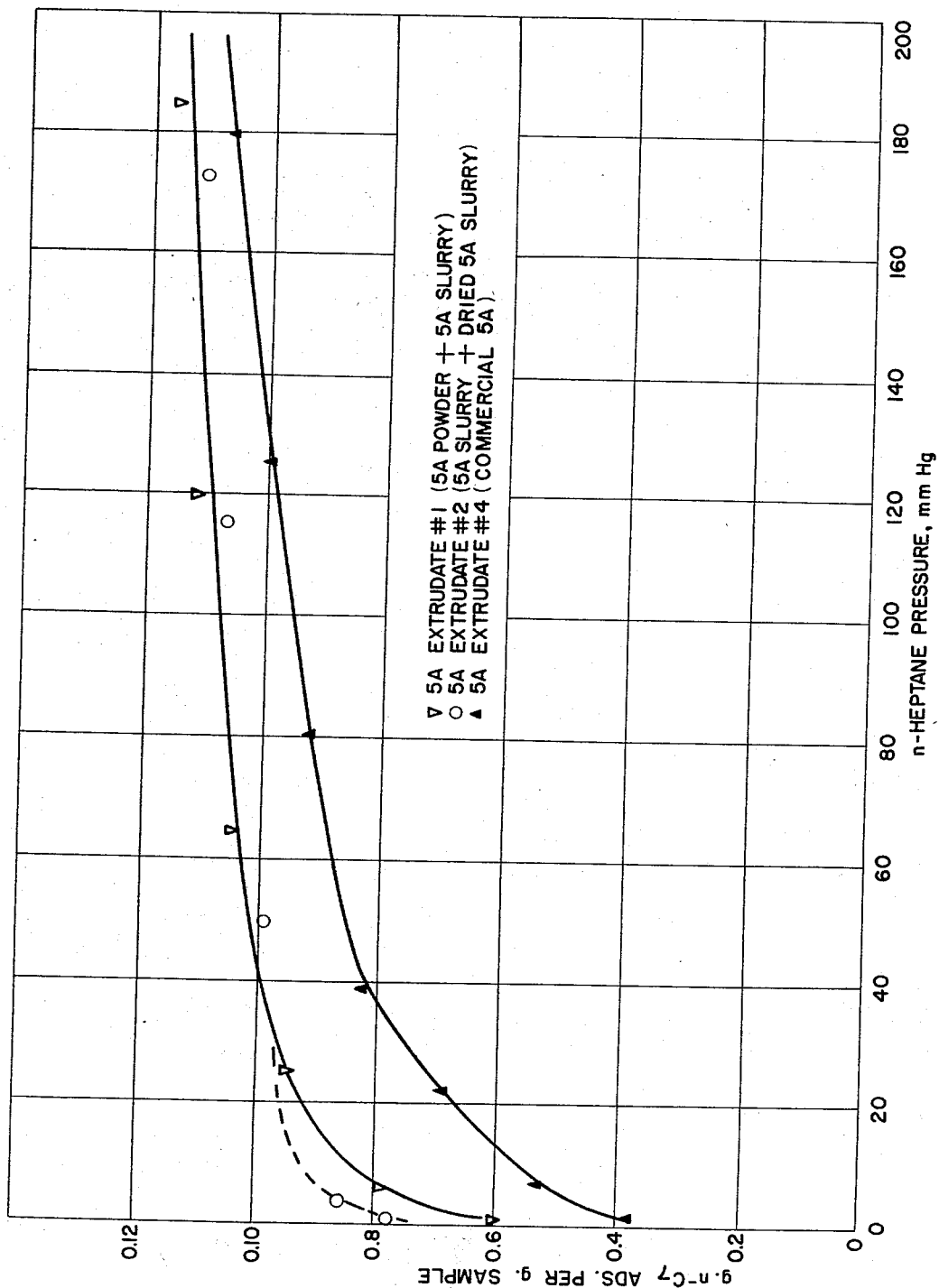

3,323,876
AGGLOMERATION OF CRYSTALLINE ALUMINO-SILICATE ZEOLITES
William Floyd Arey, Jr., and Clark Edward Adams, Baton Rouge, La., assignors to Esso Research and Engineering Company, a corporation of Delaware
Filed July 6, 1962, Ser. No. 208,032
3 Claims. (Cl. 23—313)

The present invention is concerned with means for obtaining improved structures of crystalline alumino-silicate zeolites suitable for fluid bed and/or fixed bed operations. More particularly, it deals with the preparation of improved forms of crystalline alumino-silicate zeolites which contain at least a portion of zeolites which have been severely attrited to an average particle size of less than 0.3 micron, and preferably less than 0.1 micron.

Crystalline metallic alumino-silicate zeolites, often loosely termed "molecular sieves" are well-known in the art. They are characterized by their highly ordered crystalline structures and have pores of nearly uniform dimensions in the general range of about 3 to 15 Angstroms. These crystalline zeolites have an alumino-silicate anionic cage structure in which the alumina and silica tetrahedra are intimately connected to each other. Metal cations or hydrogen are distributed through the structure to maintain electrical neutrality. The highly ordered dispersion of the alumina and silica tetrahedra makes for a large number of active sites and the uniform pore openings of the zeolites allow for easy ingress of certain molecular structures.

Thus, zeolites having average pore diameters of 4 to 5 Angstroms will adsorb normal paraffin hydrocarbons while excluding branched hydrocarbons. Large pore sieves, i.e. effective pore diameters of 6 to 15 Angstroms, have an adsorptive affinity for olefins, cyclic and aromatic constituents, etc. Moreover, these large pore zeolites have recently been found to have catalytic effect in various conversion processes, as is described in U.S. Patents 2,971,-903 and 2,971,904. These zeolites occur naturally. However, they have found considerable acceptance in the market place due to their substantially increased availability from synthetic sources. A naturally occurring example of a large pore zeolite is the mineral faujasite. Synthetically produced alumina-silicate zeolites having large effective pore diameters have been termed in the industry as Type 13, i.e. "13X" and "13Y," molecular sieves. Another large pore zeolite, synthetic mordenite, and the hydrogen form of mordenite, have an effective pore diameter of about 10 Angstroms and have recently become available in large quantity (see Chem. and Engineering News, March 12, 1962).

In general, the chemical formula of the anhydrous form of the crystalline alumino-silicate zeolites, expressed in terms of mols may be represented as—

$$0.9 \pm 0.2 Me_{2/n}O : Al_2O_3 : XSiO_2$$

wherein Me is selected from the group consisting of metal cations and hydrogen, $n$ is its valence, and X is a number from 1 to 14, preferably 2 to 12. The large pore zeolites have an X value generally in the range of 2.5 to 12, whereas the 4 to 5 Angstrom zeolites have small ratios of silica to alumina. The zeolite as produced or found in nature normally contains a substantial portion of an alkali metal such as sodium, or an alkaline earth metal such as calcium.

The processes for producing such zeolites synthetically are now well known in the art. The crystalline zeolites are prepared by having present in the reaction mixture: $Al_2O_3$ as sodium aluminate, alumina sol and the like; $SiO_2$ as sodium silicate and/or silica gel and/or silica sol; and alkaline hydroxide, e.g. sodium hydroxide, either free or in combination with the above components. Careful control is kept over the soda concentration of the mixture, as well as the proportions of silica to alumina and soda (metal oxide) to silica, the crystallization period, etc., all in a manner known per se. A general scheme for preparing large pore crystalline alumino-silicate zeolites would be as follows:

Colloidal silica, such as commercial Ludox, is mixed with a solution of sodium hydroxide and sodium aluminate at ambient temperatures. The reaction mixture may be allowed to digest at ambient temperatures for periods of up to 40 hours or more, e.g. 24 hours. The reaction mixture is then heated to 180° to 250° F., preferably 200° to 220° F., for a period of 24 to 200 hours or more, preferably 50 to 100 hours, in order to effect crystallization. The crystalline, metallic alumino-silicate is then separated from the aqueous mother liquor by decantation and washed and thus recovered as a crystalline product having an average particle size of about 1 to 10 microns.

The following table sets forth a summary of the molar ratios of reactants normally employed in the synthesis of such crystalline alumino-silicate zeolites.

TABLE I

| Reactants (Mole Ratio) | General Range | Preferred Range for 4 to 5A. | Preferred Range for 13X | Preferred Range for 13Y |
|---|---|---|---|---|
| Na$_2$O/SiO$_2$ in Reaction Mixture | 0.1–2 | 0.7–1.5 | 0.7–1.5 | 0.2–0.8, especially 0.2S–0.45. |
| SiO$_2$/Al$_2$O$_3$ in Reaction Mixture | 1–40 | 1.5–2.5 | 2.5–5 | 8–30, especially 10–30. |
| SiO$_2$/Al$_2$O$_3$ in Crystalline Zeolite Product. | 1–14 | 1–2.2 | 2–3 | 4–6, especially 5–6. |

One of the problems encountered in employing such crystalline alumino-silicate zeolties in many commercial operations, e.g. fixed bed reactors and adsorption systems, is their relatively small size. In order to form a zeolite structure of proper size, e.g. pellets of $\frac{1}{16}$" to 1" diameter, heretofore the zeolites were admixed with an extraneous material such as clay as a binder and the resulting admixture subjected to a structure forming operation such as extrusion and dicing. This extraneous additive is undesirable in that it dilutes the desired crystalline alumino-silicate zeolite as well as often causing undesired reactions during the ultimate use of the zeolite structure.

Additionally, often it is desired to form microspherical zeolite particles ranging from 20 to 200 microns having sufficient strength and resistance to attrition and suitable for use in fluidized bed operations. The zeolites as produced are unsuitable in such operations because particles of less than 10 microns do not exhibit fluidized bed properties when exposed to flowing gas stream.

The present invention overcomes the above difficulties and represents a means for obtaining micro or macrospheres or other shapes of crystalline alumino-silicate zeolites having good attrition resistance, satisfactory strength and being of the desired size range for the use intended. Moreover these structures may consist essentially entirely of crystalline alumino-silicate zeolites and thus be free of various diluents and/or binders.

More particularly, crystalline alumino-silicate zeolites are subjected to a severe attrition operation so as to reduce their average particle size to less than 0.3 micron, preferably less than 0.1 micron. The average particle size may range from 0.3 to less than 0.05 micron.

The resulting severely attrited zeolite may then be formed into microspheres by any of a variety of well known processes. Typically, the severe attrition is conducted while the zeolite is in the form of an aqueous suspension, the resulting finely ground slurry of zeolite particles thereafter being converted into microspheres by, for example, spray drying at a temperature of 210° to 500° F. Alternatively, the attrited suspension may be contacted with an agitated hot oil such as nujol, gas oil, or other petroleum fractions boiling above about 215° F., maintained at a temperature of 212° to 500° F. The hot oil vaporizes the aqueous phase and results in the formation of spheroidal zeolite particles which may then be recovered by known methods such as settling, filtration or centrifugation.

When it is desired to form relatively large size crystalline alumino-silicate structures for use in fixed or fixed-moving bed operations, i.e. macrospheres or pellets having diameters from 1/30" to 1", the attrited crystalline alumino-silicate zeolite normally in the form of an aqueous suspension is admixed with larger sized crystalline alumino-silicate zeolites, e.g. average particle size 1 to 300 microns, so as to serve as a binding agent therefor. The resulting admixture may then be subjected to an extrusion and/or drying operation to form particles having the desired size of about 1/16" to 1". The extrudate may be subjected to heating at a temperature of 500° to 1500° F., preferably 700° to 1100° F. In such operations preferably more than 15 wt. percent of attrited zeolite (on a dry basis) is admixed with the relatively coarser zeolite. The final composition will generally contain 10 to 90 wt. percent of relatively coarse zeolites and 10 to 90 wt. percent of attrited zeolites as binders.

In one embodiment of the present invention the relatively coarse zeolite is simply the conventional product of the process for forming crystalline alumino-silicate zeolites. In another embodiment the relatively coarse zeolite comprises zeolites which had been previously severely attrited, then dried into coarser sized agglomerates. These coarser sized agglomerates may be further treated, e.g. ground to less than 300 microns prior to admixture with the slurry of attrited zeolites.

Normally the attrition is conducted after first having recovered the crystalline alumino-silicate zeolites from a process for peparing same in the conventional manner. Generally the crystalline product is washed to free it of extraneous matter such as sodium hydroxide. The zeolite crystals are then attrited to less than 0.3 micron, preferably less than 0.1 micron average particle size. This can be done in a number of different ways which will suggest themselves to one skilled in the art. One method consists in subjecting the zeolites to prolonged ball milling, as for example, at least equivalent to ball milling for 7 to 20 days using 1" to 1½" flint pebbles as the grinding media. In general ball milling for more than 7 days normally is sufficient, it being particularly preferred to subject the zeolite to ball milling in the presence of water so that the final product is a suspension or "mud" of zeolite in water. During the griding the suspension becomes more viscous. This resulting suspension may have a viscosity of about 10 to 1000 centipoises, the viscosity normally being greater than 25. When the solids concentration is about 35 wt. percent such suspensions are non-Newtonian systems and show a variable viscosity depending upon the shear applied in the determination of viscosity. The above viscosities are as measured with a Brookfield Viscometer at a low shear rate of about 10 to 20 r.p.m. spindle speed.

A particularly preferred method of subjecting the zeolite to severe attrition involves micronization in a "Vibro-Energy Mill" (manufactured by Southwestern Engineering Company, Los Angeles, Calif.). In such an operation the zeolite crystals are ground as a 10 to 50 wt. percent suspension in water by means of high frequency, three dimensional vibration imparted to cylindrical grinding media contained in a relatively stationary chamber. This equipment has the advantages of grinding materials to a very small particle size with greater speed and energy efficiency than other methods such as ball milling or hammer milling.

The resulting severely attrited zeolites are then employed in the formation of microspheres or used as a binder for larger sized zeolites in the formation of macro-sized particles, generally, as indicated above, by a process involving the removal of water, e.g. spray drying, extrusion, etc.

The present zeolite structures have demonstrated good strength and attrition resistance, are free of extraneous adulterating extrusion aids, e.g. clay, and have exhibited greater adsorption capacity and rate, as well as (when using large pore, i.e. 6 to 15 Angstrom pore diameter zeolites) higher catalytic activity than conventional compositions.

In those applications wherein crystalline alumino-silicate zeolites are to be employed as a catalyst, i.e. catalytic cracking, hydrocracking, polymerization, isomerization, alkylation and dealkylation, it is highly desirable to subject the zeolite crystals to exchange with a metal cation or hydrogen containing cation so as to reduce the soda content ($Na_2O$) to less than 10 wt. percent preferably to about 2 to 6 wt. percent (based on zeolite crystals). The metal cation is preferably a member of the group consisting of Group II, III, IV, V, VI–B; VII–B, VIII and rare earth metals, examples, thereof being the following: calcium, magnesium, aluminum, antimony, barium, cadmium; rare earth metals such as cerium, praseodymium, lanthanum, neodymium and samarium; chromium, cobalt, copper, iron, lead, lithium, manganese, nickel, silver, strontium, zinc, tin, platinum, palladium, molybdenum, vanadium, rhodium, and zirconium. The hydrogen containing cation is preferably a hydrogen ion or an ammonium ion.

When making microspheres directly from the attrited sieves the attrited sieves may be base exchanged either before or after their conversion to fluidizable particles, e.g. the spray drying step. When employing the attrited zeolites as binders in general, the coarser sized zeolites as well as the attrited zeolites are subjected to base exchange either separately or together such as after the formation of an extrudate. Base exchange with the above metals or hydrogen containing cations may be conducted at a temperature of 60° to 150° F., the exchanged zeolite containing 3 to 20 wt. percent of the exchanging metals as a catalytic agent.

In general, heat treatment of the ultimate zeolite structures at temperatures of 500° to 1500° F., preferably 750° to 1250° F. for 1 to 2 hours, is desirable.

The various aspects and modifications of the present invention will be made more clearly apparent by reference to the following examples and accompanying drawing.

In the following examples conventional crystalline alumino-silicates hereinafter termed "4A," "5A" and "Type 13" zeolites or "molecular sieves" were employed. Such zeolites are manufactured by the Linde Division of Union Carbide Corporation, New York, N.Y. The following represents the chemical structure and size range of these commercial zeolite materials:

Zeolite

4A—1.0±0.2 $Na_2O:Al_2O_3$:1.9±0.5 $SiO_2$; particle size range, 1 to 10 microns; average particle size, 2 to 3 microns 5A—1.0±0.2 $CaO:Al_2O_3$:1.9±0.5 $SiO_2$; particle size range, 1 to 10 microns; average particle size, 2 to 3 microns Type 13—0.9±0.2 $Na_2O:Al_2O_3$:2.7 $SiO_2$; particle size range, 1 to 10 microns; average particle size, 2 to 3 microns

EXAMPLE 1

150 grams of the above described 4A crystalline zeolite power was ground with 300 cc. of water in a ball mill containing 1 to 1½ inch diameter flint pebbles having a density of 2.6 for 13 days at 80 r.p.m. The resulting product appeared clay-like and had an average particle size diameter of about 0.3 micron. It formed a hard cake on drying.

The addition of 21 grams of dry conventional 4A zeolite powder to 35 grams of the resulting attrited slurry (containing 11.7 grams of attrited zeolite) gave a mixture which could be extruded through a 1/16" diameter die at a temperature of 77° F. and a pressure of 10,000 to 16,000 p.s.i.g. to give a reasonably firm extrudate.

EXAMPLE 2

Type 5A crystalline alumino-silicate zeolite powder and Type 13 zeolite were micronized in a Vibro-Energy Mill. The 5A sieve was ground for 12 hours as a 35% suspension in water to less than 0.1 micron average particle size. The Type 13 sieve was ground for 18 hours as a 38% suspension in water to an average particle size of less than 0.1 micron. Attrition was effected by imparting vibrational energy to ½" x ½" Burundum cylinders by means of an eccentrically mounted and balanced drive from a 2 horsepower, 1140 r.p.m. electric motor.

The micronized suspensions were allowed to settle and some clear supernatant water decanted before use. The resulting slurries were used in the following examples:

Exaporation of water from samples of the upper layer of the slurries after standing, i.e. the part containing the finest particle size material, showed 29 wt. percent solids in the 5 Angstrom sieve slurry and 21 wt. percent of solids in the Type 13 sieve slurry. Particle size analysis showed an average particle size less than 0.1 micron with electron microscopy showing few particles as large as 1 micron and with particle sizes ranging to as low as 0.01 micron and less.

EXAMPLES 3 AND 4

Extrusion of 5A sieve using 5A ground slurry 100 g. of 5A molecular sieve powder was added to 226 g. ground 5A slurry and the mixture was well mixed. This mixture extruded through a 1/16" diameter die in the laboratory press at 10,000 to 18,000 p.s.i.g. pressure to give a reasonably good extrudate. Mixtures with less slurry failed to give extrusion. The extrudate was dried by heating to 1000° F. and designated as 5A extrudate #1.

110 g. of dried ground 5A slurry pulverized to pass through a 50 mesh, i.e. 297 microns, screen was added to 150 g. of ground 5A slurry and the mixture was well mixed. This mixture extruded readily through a 1/16" diameter die in the laboratory press. An excellent appearing extrudate was obtained and designated as 5A extrudate #2. The extrudate was dried at 1000° F.

For comparative purposes a conventional 5A sieve extrudate was prepared in the laboratory equipment using a mixture of 85 g. 5A sieve powder and 15 g. bentonite (USP, Fisher Chem. Co.) with 60 g. of distilled water. This extrudate was heated at 1000° F. and designated as 5A extrudate #3. A commercially available 1/16" diameter extrudate 5A sieve from Linde Company was also used for comparison designated as 5A extrudate #4 after heating at 1000° F.

EXAMPLES 5 AND 6

Evaluation of crystalline zeolite extrudates 5A molecular sieve extrudates described previously were evaluated for their various properties in the following tests.

Adsorption capacity and rate

The adsorption capacity and rate were tested in a conventional adsorption apparatus with n-heptane (Phillips pure grade, 99+ mole percent) at boiling n-heptane temperature (98° C.). Adsorption isotherms are shown in the attached drawing for 5A 1/16" extrudates #1, #2 and #4 described previously (i.e. 5A powder plus 5A slurry; 5A slurry plus dried 5A slurry and Linde commercial 5A extrudate, respectively). From the adsorption isotherms shown in the drawing it is noted that the experimental extrudates have a higher ultimate capacity at the higher partial pressures than the commercial sample by an amount (5 to 10%) about equal to the amount of extraneous extrusion aid (clay) understood to be used to form the commercial sample. It was also noted that the experimental samples adsorbed the n-heptane more readily and rapidly at low pressures than the commercial extrudate. This is evident from the shape of the curves at lower pressures where an advantage for the extrudate made wholly from finely ground material is shown even over the extrudate made with the conventional powder plus finely ground 5A. This would be advantageous in adsorption processes as more material would be adsorbed more rapidly at lower pressures.

EXAMPLE 7

Extraneous catalytic activity

Small pore zeolites are not generally effective as hydrocarbon conversion catalysts and are normally employed simply for adsorption processes wherein catalytic side effects are undesirable.

One of the disadvantages for using material such as clays, etc., to form sieve extrudates is that these materials which are effective as extrusion aids have catalytic properties usually detrimental to the adsorption processes in which the sieves are used. These materials catalyze cracking, isomerization and polymerization, particularly of unsaturated hydrocarbons, which leads to deactivation of sieve properties and to contamination of product streams. Others have proposed to reduce this effect by selectively deactivating the binder aids by various means after the extrudate is formed. Such means are not wholly effective, however, and it is obviously preferred to eliminate these materials as in the present invention.

The effectiveness of the present invention for making 5A extrudates with less catalytic activity is shown in the following test. A sample of the extrudate (about 5 g.) was treated with propylene gas at 250° F. and atmospheric pressure for two hours with a propylene flow rate of about 15 liters per hour. After the propylene treat, the sample and reactor were flushed with nitrogen flowing at a rate of 30 liters per hour for 30 minutes. The discharged sample was then analyzed for carbon content. The 5A 1/16" extrudates previously described as #2 (5A slurry plus dried 5A slurry), #3 (5A powder plus 15% bentonite plus water) and #4 (commercial extrudate) were so tested with results tabulated below:

| 1/16" 5A Extrudate: | Wt. percent carbon formed Propylene test, 250° F. |
|---|---|
| #2 (5A slurry plus dried 5A slurry) | 0.3 |
| #3 (5A powder plus 15% bentonite) | 0.9 |
| #4 (Linde commercial) | 0.6 |

EXAMPLE 8

Pill strength

As a measure of the suitability of extrudates for use in commercial reactors the pill strength test was used. In this test a pellet is put between two anvils (3/16" wide) and the force in pounds necessary to crush the pill is measured. The average value of a number of such determinations is used. A high pill strength is desirable for physical stability. High pill strength may, however, be a disadvantage if it is obtained by making the material less pervious and accessible to feed. Conditions of formation including extrusion aid, amount of water, pressure, etc., are usually found to be quite critical in formation of the preferred extrudate.

The 5A extrudates used in this test were previously described as #2 (5A slurry plus dried 5A slurry), #3 (5A powder plus 15% bentonite plus water). The following values were obtained:

1/16" 5A Extrudate:             Pill strength, pounds
   #2 (5A slurry plus 5A dried slurry) _____ 2
   #3 (5A powder plus 15% bentonite) _____ 3

2 is nearly as strong as #3 made with the same laboratory equipment and conventional formulation.

EXAMPLE 9

*Extrusion of large pore zeolite using zeolite ground slurry*

A sample of the micronized Type 13 molecular sieve described in Example 2 was dried at 270° F. and the resulting solid was ground to pass a 50 mesh screen, i.e. less than 297 microns. To 120 g. of this dried attrited slurry Type 13 was added 70 g. of water the mixture was well mixed. It was noted there was some tendency for this mixture to form balls or agglomerates so the mixture was forced through a 50 mesh screen. This mixture then extruded well through a 1/16" die in the laboratory press at 10,000 to 18,000 p.s.i.g. pressure. The resulting extrudate was heated overnight at 1000° F. and compared with a Linde Co. commercial Type 13 1/16" extrudate in the following evaluations.

EXAMPLE 10

*Pill strength*

The experimental extrudate made only of ground Type 13 molecular sieve showed an average pill strength of 2 pounds which was the same average value as that obtained for the Linde commercial sample. The pill strength test was carried out in the same way as that described in the previous examples.

EXAMPLE 11

*Catalytic activity*

The catalytic activity of the ground and the Linde commercial Type 13 extrudates was compared in the propylene test described previously. It is know that the Type 13 molecular sieves are active catalysts for polymerization, cracking, etc. The propylene test was thus used to show such activity by determining the ignition loss, which gives an indication of the formation and adsorption of high molecular weight compounds, as well as the determination of carbon content. This catalytic activity is inherent and desired in the 13X type structure and is thus also an indication of the availability of the sieve structure for adsorption.

| 1/16" 13X Extrudate | Propylene Test | |
|---|---|---|
|  | Wt. Percent Ignition Loss | Wt. Percent Carbon |
| Ground 13X | 5.4 | 1.6 |
| Linde Commercial | 0.0 | 0.1 |

It is thus seen that a higher catalytic activity is shown for the ground Type 13 extrudates. This is presumably due to the greater availability of surface and internal structures in the absence of the extrusion aid used to form the Linde commercial extrudate.

EXAMPLE 12

Samples of the ground slurries of 5A and Type 13 zeolites described in Example 2 were dried in an oven at about 270° F. These products gave a firm clay-like cake which was then ground in a mortar and screened through 50 mesh and on 100 or on 200 mesh screens. The resulting sized powders were charged to a 35 mm. I.D. tube and fluidized with air at a velocity of about 0.3 ft./sec. These samples fluidized well and showed little disintegration under these conditions in comparison with ground commercial synthetic silica-alumina cracking catalyst. Even further advantage should be obtained if the sieve slurries had been spray dried to form microspherical particles.

Various modifications of the present invention will suggest themselves to one skilled in the art. For example, the present crystalline zeolite structures may be employed as a base for a platinum group metal and thus employed to effect catalytic conversions such as, for example, hydrocracking, hydroisomerization, etc.

Having described the present invention, that which is sought to be protected is set forth in the following claims.

What is claimed is:

1. A process for forming an improved crystalline alumino-silicate zeolite structure which comprises slurrying crystalline alumino-silicate zeolites in water to produce an aqueous suspension, subjecting said suspension of zeolites to severe attrition so as to reduce their average particle size to less than 0.3 micron, drying a portion of said suspension to form zeolitic particulate masses having an average particle size diameter greater than 1 micron, admixing said dried particulate masses with the remainder of said attrited aqueous suspension, and subjecting the admixture of the particulate masses and the attrited aqueous suspension to a drying step so as to form zeolite structures of a size substantially larger than the original particle size of said zeolites.

2. The process of claim 1 wherein said drying step comprises contacting the admixture of the particulate masses and the attrited aqueous suspension with hot oil to thereby form crystalline zeolite macrospheres.

3. The process of claim 1 wherein said drying step comprises subjecting the admixture of the particulate masses and the attrited aqueous suspension to spray drying.

References Cited

UNITED STATES PATENTS

| | | | |
|---|---|---|---|
| 2,865,967 | 12/1958 | Van Dyke et al. | 252—455 |
| 2,916,437 | 12/1959 | Gilbert | 252—455 |
| 2,983,670 | 5/1961 | Seubold | 252—455 X |
| 3,033,642 | 5/1962 | Bukata et al. | 23—2 |
| 3,033,801 | 5/1962 | Kloepfer | 252—449 X |
| 3,065,054 | 11/1962 | Haden et al | 252—455 |
| 3,140,249 | 7/1964 | Plank et al. | 252—455 X |

OTHER REFERENCES

Ludwig, "Chemical Engineering," January 1954, pages 156–160.

OSCAR R. VERTIZ, *Primary Examiner.*

M. A. BRINDISI, BENJAMIN HENKIN, *Examiners.*

E. J. MEROS, *Assistant Examiner.*